United States Patent
Wetch et al.

[15] 3,647,394
[45] Mar. 7, 1972

[54] MUFFLER DEVICE FOR REMOVING IMPURITIES

[72] Inventors: Joseph R. Wetch, Sherman Oaks; Seymour Sudar, Malibu; Louis L. Bienvenue, Canoga Park, all of Calif.

[73] Assignee: North American Rockwell Corporation

[22] Filed: Feb. 20, 1970

[21] Appl. No.: 13,247

[52] U.S. Cl.................................23/288 F, 23/2 E, 23/285, 23/284, 261/116, 60/30 L
[51] Int. Cl..........................................................F01n 3/16
[58] Field of Search......................23/288.3 F, 1 D, 285, 284, 23/2, 181, 277 C; 60/30; 261/DIG. 54, 116; 55/DIG. 30

[56] References Cited

UNITED STATES PATENTS

| | | | |
|---|---|---|---|
| 3,197,287 | 7/1965 | Innes et al. | 23/288.3 F |
| 3,438,727 | 4/1969 | Heredy | 23/181 |
| 3,438,728 | 4/1969 | Grantham | 23/181 |

FOREIGN PATENTS OR APPLICATIONS

| | | | |
|---|---|---|---|
| 1,010,415 | 11/1965 | Great Britain | 261/DIG. 54 |

*Primary Examiner*—James H. Tayman, Jr.
*Attorney*—L. Lee Humphries, Henry Kolin and Thomas S. MacDonald

[57] ABSTRACT

A muffler, scrubber or chemical reactor device for utilization with combustion engines to aid in the removal of impurities from exhaust gases, comprising a housing having a packing therein, an inlet line to said housing for conducting the exhaust gas from said engine thereto, a construction such as a venturi within the inlet line through which exhaust gas will pass, means for aspirating a reactant material into the exhaust gas near the venturi throat and for utilizing the thermal energy of the exhaust gas for liquefaction of materials where needed, an outlet from the housing, and a cooled bypass line ahead of and around the orifice or venturi to provide temperature and pressure control in and across the device.

14 Claims, 7 Drawing Figures

INVENTORS.
JOSEPH R. WETCH
SEYMOUR SUDAR
BY   LOUIS L. BIENVENUE

Henry Kolin
ATTORNEY

INVENTORS.
JOSEPH R. WETCH
SEYMOUR SUDAR
LOUIS L. BIENVENUE

BY Henry Kolin
ATTORNEY

MUFFLER DEVICE FOR REMOVING IMPURITIES

BACKGROUND OF THE INVENTION

This invention relates to a muffler device useful for removing impurities from exhaust gases produced by combustion engines while serving the acoustic function of a standard muffler. Particularly, the invention relates to a muffler device useful for the process of removing impurities from exhaust gases by contacting the gases with a liquid scrubbing medium, such as a molten salt mixture, liquid metals, organic sorbents, or aqueous solutions.

In copending application Ser. No. 13,248, filed Feb. 20, 1970, there is disclosed a process for the removal of impurities including nitrogen oxides, lead halides, organic sulfur compounds, and solid particulate matter including carbonaceous substances and the like, from automotive exhaust gases by contacting the exhaust gas with a molten salt mixture comprised of alkali metal carbonates. In application Ser. No. 13,245, filed Feb. 20, 1970, there is additionally disclosed various muffler designs which are useful for practicing the process for removal of impurities from exhaust gases utilizing the molten salt mixture. Further, in copending application Ser. No. 13,246 filed Feb. 20, 1970, there is disclosed a method and muffler system where the exhaust gas first contacts the molten salt and then passes over a dry selected metal mesh. The device of the herein invention is a further improvement on the basic muffler systems disclosed in the above-mentioned copending applications. Further, the device of the herein invention can be used for other applications. In the preferred embodiment of the invention utilizing a molten salt, particularly for the removal of lead halides, $NO_2$, sulfur compounds, particulates and heavy hydrocarbons this first stage device may be used alone. In cases where it is necessary to remove nitrogen oxides which are principally present as NO, as indicated in the copending applications, it is desirable to subsequently pass the exhaust gas through a dry catalytic packing after being precleaned by this scrubber.

In any event, it has been found that such a muffler incorporating a catalytic packing requires means to prevent poisoning of the catalyst surface. In prior art systems utilizing catalysts in mufflers to remove impurities, one of the most prevalent problems is lead poisoning on the surface of the catalyst. The use of a device that provides liquid continually scrubbing the gas to remove the lead therefrom and prevent poisoning before the gas enters a catalytic packing is desirable. Alternatively, the use of a liquid to remove lead prior to the gas passing to the catalyst is contemplated. Thus, the herein invention is directed to a muffler including both a packing and a material that is liquid at the operating temperatures of the engine that will remove lead from the exhaust gas. This device can also be used to preclean exhausts before they are recirculated to the engine inlet manifold in exhaust recycle systems for nitrogen oxide control, thus alleviating many of the operating problems of that system by permitting recycling of clean exhaust.

In view of the aforegoing basic requirements of the herein muffler design, certain requirements must be met in order to make it functional. It is important that the liquid utilized in the muffler system not be carried out in the exhaust stream to deplete the reservoir thereof. Further, since a scrubbing action is particularly desired, means must be provided for adequately recirculating the liquid. If the material which forms the liquid at the operating temperature of the engine is not molten at ambient temperatures, then means must be provided for preheating and melting the material when the engine starts up. Additionally, of course, suitable means must be provided in the muffler for recirculation of the liquid and particularly directing the gas across and through the packing material in order to extend the reactive surface area and to trap the entrained reactive material. Finally, in a muffler system incorporating a liquid, the muffler should be insensitive to angular disposition of the automobile and any sloshing of the liquid due to acceleration and deceleration. Of course, the design of any such muffler device must be compatible with the application configurations so that it is practically utilizable.

SUMMARY OF THE INVENTION

The muffler device of the herein invention incorporates a packing material which is preferably comprised of a finely divided surface which can serve for filtering impurities from exhaust gas and/or a means for providing chemical reactive sites. Further, the packing can serve as a demister to remove entrained liquid from the gas stream. The packing is incorporated in a muffler, scrubber or reactor housing with means for conducting the exhaust gas from the engine through the packing and out the muffler. A reservoir of a material which is molten or liquid at least at the operating temperatures of the engine is additionally contemplated as part of the device. Means is provided for conducting the liquid from the reservoir into the exhaust gas stream prior to the exhaust gas contacting the packing. The means is preferably a venturi device which will aspirate the liquid into the exhaust gas stream, the liquid material utilized will react with impurities in the exhaust gas, serving to remove them. The liquid particles are carried with the gas into the packing, which serves to wet the packing and scrub the surface thereof. In one embodiment, the wetted packing is a demister which removes the liquid from the gas prior to contact with a dry catalyst surface. In some embodiments of this system, it is desirable to draw a reactant gas into the system. This can be conveniently accomplished by utilizing the above-described liquid aspirating venturi to also draw gas from an external source simultaneously.

In an embodiment of the invention the reservoir of the material which is at least liquid at the operating temperatures of the engine is incorporated in the muffler housing, together with the associated venturi device. Particularly, it is desirable that the reservoir be located in a position so that at least a portion thereof adjacent to the venturi device can be heated by the exhaust gas from the engine to cause an initial melting thereof, and under continued operation all reacting material can be made molten. The residual reactive material that remains on the packing after initial circulation of the liquid provides a fast-melting reactive material for effective gas cleaning on cold system startup. In order that the engine with which the muffler is associated is not affected by the constriction of the venturi device, preferably the venturi is operated at a relatively constant pressure drop. Also, in order to protect the muffler and packing from burnup and corrosion, it is desirable to maintain them below a temperature limit. Thus, a cooling bypass means is preferably provided so that at least a portion of the gas can circumvent the venturi, cool, and pass directly through the packing in the muffler device as the pressure and/or temperature in the exhaust from the engine increases. The exhaust gas in the bypass tube will cool due to radiation and air convention as power and speed is increased. Thus, the packing temperature can be held to desired levels. In an additional embodiment of the invention, an inlet line can be connected to the aspirator device to draw air into the muffler if desired to oxidize NO to $NO_2$. Further, in one version of the invention where molten carbonate salt mixture is utilized, a means is provided for adding carbonaceous material to the salt, which serves to regenerate in a manner prescribed in the aforementioned copending patent applications. In another preferred embodiment of the invention a three stage muffler is provided. In the first stage the exhaust gas contacts a molten carbonate. Next, the gas is directed over and through a demister to remove entrapped carbonate. In a second stage the dry gas passes over a dry catalyst to reduce NO to $N_2$ gas. Lastly, the exhaust passes through a dry catalytic material where it may further be mixed with $O_2$ or air to convert any CO to $CO_2$ and HC to $CO_2$ and $H_2O$. It is believed that the invention will be better understood from the following detailed description and drawings.

DESCRIPTION OF THE PREFERRED EMBODIMENTS

Figure 3:
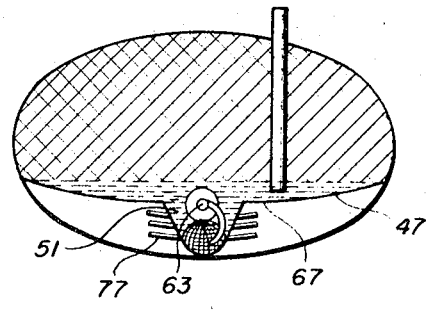
FIG. 3 is a cross-sectional view taken along lines 3—3 of FIG. 2.

One of the underlying novel aspects of the muffler invention herein is an auto exhaust aspirator system that permits the suction of materials such as liquids, gases and air directly into the automobile exhaust gas stream under all driving conditions. This is preferably accomplished by the utilization of a venturi-type device which performs the aspirating function. This in itself can be a useful application. The invention was particularly derived however to provide a means for drawing liquid from a reservoir into the exhaust gas stream, particularly drawing a molten alkali metal carbonate salt mixture into the gas stream within a muffler device. However, the venturi is also useful to draw gases such as crankcase gas, rich in CO, to promote reduction reactions in the exhaust gas, or to aspirate ambient air to promote oxidation reactions in the exhaust stream. The schematic diagram of FIG. 1 represents the broad concept of utilizing a venturi to draw materials into the gas stream, whereas FIGS. 2 and 3 are particularly directed to a design utilizing a catalyst surface or a packing material in preferably a molten salt.

Figure 1:
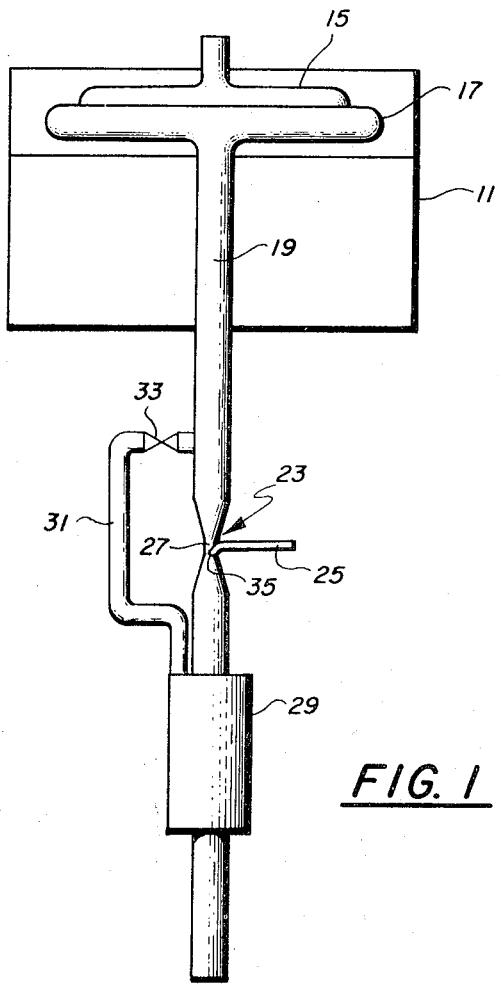
FIG. 1 is a schematic representation of the muffler system in accord with the herein invention as connected to an internal combustion engine.
Figure 2:
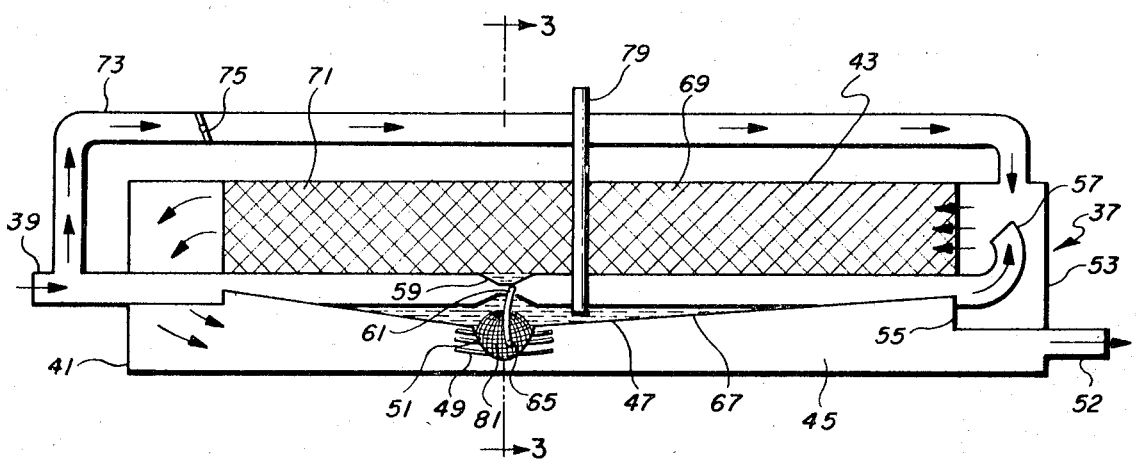
FIG. 2 is a partially sectioned pictorial representation of a particular embodiment of a muffler design of the herein invention.

Turning to FIG. 1, there is schematically seen an internal combustion engine 11. Additionally, there is schematically shown an intake manifold 15 and exhaust manifold 17, which in turn is connected to an exhaust pipe 19. Disposed in the exhaust pipe 19 is a constricted throat area or venturi 23. In place of a venturi an orifice can be used to constrict the pipe to decrease the pressure thereat in order to obtain suction. An inlet line 25 intersects the throat area 27 of the venturi 23, whereby material can be aspirated into the exhaust gas stream. Such material can include air, reactor liquids, or gases, depending upon the source to which the line 25 is connected. The exhaust gas leaving the aspirator 23 is then carried into a reactor 29. Reactor 29 can be a housing which will serve as a muffler. Liquid reactant agents can be introduced into the exhaust gas stream by means of the aspirator line 25. The reactor can further contain catalytic material whose function will be explained in the embodiments of the remaining figures. Under high engine loads the exhaust gas temperatures leaving the engine 11 can be excessively high and could damage the reactor 29, and the venturi, which is a restriction in the line, as seen in 27, can cause a pressure buildup in the exhaust tube 19. This can result in reduced engine performance to the point where the engine could possibly stall or lose power. As a result, it is preferred and preferably required that a bypass cooling line 31 intersect the exhaust line 19 between the engine 11 and the venturi 23, so that a portion of the exhaust gases can bypass the venturi, be cooled, and be carried directly to the reactor 29. A pressure and/or temperature actuated bypass valve 33 can be provided in the line 31. Adjustment of the pressure and/or temperature actuated valve 33 can permit ready adaptability of the aspirator system to engines with varying exhaust flow characteristics. The valve 33 is preferably adjusted so that the venturi 23 will operate at a reasonably constant pressure. Once this pressure level is exceeded or temperature becomes excessive, the bypass valve 33 opens to a position where a portion of the exhaust gas is diverted through bypass cooling line 31 serving to maintain the pressure through the venturi 23 at such a constant level and the temperature in the reactor within acceptable limits.

Under normal operating or driving conditions, most all of the exhaust gas stream will flow through the venturi portion 23. Under high engine loads, or at high vehicle velocities and on up-hill grades, the pressure and temperature upstream of the venturi section can increase significantly. At the preset pressure and/or temperature the relief valve 33 will then direct a portion of the exhaust gas through the bypass cooling line 31 directly into the reactor section 29. At all times, however, a portion of the exhaust gas will be continuously flowing through the venturi section 23 to achieve the aspirating function while the automobile is operating. Generally at normal operating driving conditions, the system described would receive full exhaust flow. However, under high-acceleration or high-speed conditions it may be more economical to bypass a portion of the exhaust around the system.

The intake line 25 of the venturi device 23 has an injection nozzle portion 35. Nozzle 35 facilitates the dispersion of aspirated liquids as a fine spray in the exhaust gas stream to provide good contact between the liquid particles and the exhaust gas when such is desired. For example, it has been found that nozzle diameters of up to 0.080 inch I.D. provide satisfactory dispersions of liquid into exhaust gases.

FIGS. 2 and 3 represent an embodiment of the invention which is particularly useful and compatible with present automobile design. The device is comprised of an enclosed housing 37. An exhaust inlet line 39 intersects a forward end 41 of the housing, conducting exhaust gas from the internal combustion engine into the housing. The housing 37 is comprised of two compartments. These compartments are an upper area 43 and a lower compartment 45. The two compartments within the housing are formed as a result of dividing plate or surface 47 which extends from the outer walls of the housing and is sloped inwardly towards the center of the device. At or near the center of the housing the surface 47 is curved downwardly at 49 to form a pocket or sump 51 therein. An outlet 52 from the housing intersects the downstream end 53 thereof and is sealed to surface 47 by wall 55.

The inlet line 39 extends throughout the housing 37 from the forward end 41 to adjacent the rear end 53 where it is then curved upwardly at 57. A venturi 59 is formed in the tube 39 adjacent the pocket area 51. An aspirating tube 61 extends from a nozzle portion 63 within the tube 39 to a pickup end 65 disposed within the pocket 51. Resting on top of the surface of plate 47 and filling the pocket 51 is a material 67 which is made liquid at the operating temperature of the engine by thermal energy transfer from the hot exhaust gas stream. In the particular embodiment shown the material 67 is preferably a molten eutectic salt of alkali metal carbonates.

Upper chamber 43 in the housing contains a packing of a finely divided surface, such as wire mesh or the like. Preferably the packing is of two densities. A first packing region 69 provides a reaction surface and particulates (i.e., Pb compounds, etc.) and the scrubbing liquid from the gas stream. The second region 71 can be a dry catalyst region where this is desirable. Through design of the packing, the extent of wetted and dry area can be accommodated as desired within the state of the art. For example, the entire first and second mesh regions can be of equal density and the entire mesh being wetted by the liquid. The muffler is additionally provided with a bypass line 73 which intersects the inlet line 39 outside of the housing and traverses the length of the housing, entering it adjacent the rear downstream end 53 thereof. A valve 75 is disposed in the bypass line 73 and is pressure-actuated, depending upon the back pressure from the venturi 59 in a manner described with regard to the schematic diagram of FIG. 1.

In the operation of the muffler device shown in FIGS. 2 and 3 the gas is admitted through inlet 39, passes through venturi 59 and is ejected at the curved end 57 where it is directed through the mesh 69 and 71 back toward the forward end 41 of the device, where it will enter the lower chamber 45 and again traverse the length of the muffler, exiting through the outlet 52. When the engine is first started the preferred eutectic carbonate material is in a solid state and requires melting in order to be brought into or aspirated into the exhaust stream through nozzle 63.

As can be seen, the tube 39 is in contact with the salt along its length within the housing, and thus serves to initially warm and melt the layer of the salt when the gas passes therethrough. Further, a plurality of fins 77 can be provided adjacent the pocket area 51 and extend outwardly into the lower housing 45. These fins tend to absorb the heat from the exhaust gas before it passes through outlet 51 while in the lower chamber 45, and conducts the heat into the pocket 51, further serving to particularly melt and heat up the material in the pocket which surrounds the inlet 65 to the aspirator tube 61, and start a flow of the resulting molten salt into the gas stream. The molten salt picked up in the gas stream as fine droplets due to nozzle 63 is then carried by the gas stream into the wet mesh 69 where most chemical reactions between the molten salt and the impurities in the exhaust gas can occur, as well as any reduction of impurities on the packing surface.

When a molten carbonate eutectic mixture is utilized, it may be desired that means be provided for regenerating the carbonate in a manner disclosed in the copending application Ser. No. 13,248, filed Feb. 20, 1970. This is accomplished by the addition of carbonaceous material through a fill line 79 which directs the carbonaceous material to the pocket 51. When carbonaceous material is being utilized in this manner, it is preferred to additionally incorporate a screen 81 surrounding the aspirator tube 61 to prevent it from being clogged with the particles of the carbonaceous material.

As can be appreciated, the dish-shaped surface 47 which is sloped inwardly or downwardly toward the center of the muffler, serves two functions, the first function being to allow the liquid material latitude in sloshing or movement when the car is moving uphill or downhill. Thus, the surface 47 is preferably sloped at at least a 20° angle. Further, the surface 47 further provides means for directing the liquid toward the center sump area 51 where the material is basically accumulated to be aspirated. In addition to the single aspirator tube 61 shown, it should be appreciated that additional tubes can be disposed in the venturi for aspirating materials other than the liquid concurrent with the liquid or separately therefrom. For example, a second aspirator tube could be disposed in the venturi to aspirate air or other external gas or materials into the exhaust stream.

When the liquid material comprises a salt mixture containing the eutectic of alkali metal carbonates, as indicated, it is preferred to add carbonaceous material through fill tube 79 to serve to regenerate the carbonate material in situ. The carbonaceous material is gradually utilized in a chemical reaction with the nitrites and nitrates formed in the carbonate mixture due to the reaction of the carbonate and nitrogen oxides in the exhaust gas. Thus, the supply of carbonaceous material from the fill tube will be depleted with time as the muffler is used due to this regenerative process. The fill tube can be exposed at a portion of the automobile so that it can be refilled periodically by mere visual inspection of the level of the carbonaceous material in the tube.

Figure 4:
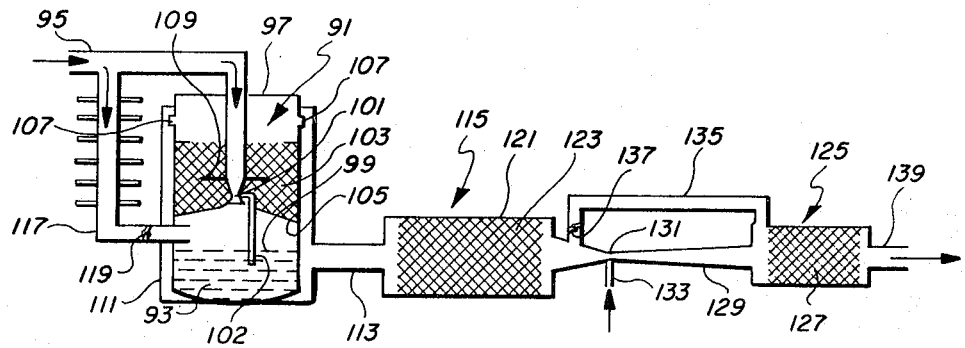
FIG. 4 is a schematic representation of a second embodiment of the invention.

Turning now to FIG. 4, there is seen a schematic drawing of a second embodiment of a device of this invention. As shown there is provided a separate scrubber unit 91 which contains a layer of alkali metal carbonate 93 in the bottom region thereof. Exhaust line 95 from the automobile enters through the top 97 of the scrubber and directs the gas against the surface 99 of the molten carbonate. Additionally, the line 95 contains a venturi 101 therein with a line 102 embedded in the carbonate. This serves to aspirate a portion of the molten carbonate directly into the exhaust gas stream prior to it contacting the surface of the molten carbonate. Disposed above the alkali-metal carbonate 93 is a metal mesh packing 103 which is supported on a perforated plate or woven wire cloth 105, thus allowing the gases that impinge on the metal carbonate to move upwardly and be demisted by the mesh so that dry gas can leave the scrubber through outlet 107. Preferably there are further disposed baffles 109 within the scrubber unit 97 so as to force the gas to be well circulated within the mesh material 103.

Surrounding the scrubber housing 97 is an outer jacket 111 into which the gas exiting through outlets 107 enters. The jacket transfers thermal energy from the gas stream to the metal carbonate to accelerate the change of the metal carbonate to the molten state from the solid state which will probably exist at engine startup, and to maintain the carbonate in the molten state. A line 113 then can carry the gas to a catalytic reactor stage 115. Srrounding the outer jacket is thermal insulation to conserve thermal energy for the purpose of melting solid reactant materials and/or to maintain the scrubber system at the optimum operating temperature.

The device is additionally provided with a bypass line 117 which intersects the exhaust line 95 prior to the venturi area 101 to carry a portion of the gas, if desired, directly to the mesh 103. Preferably the bypass line directs the gas into an area adjacent the bottom of the mesh to allow the gas to filter upwardly therethrough prior to exiting the scrubber. The bypass line is provided with a pressure sensitive valve 119 which can also be temperature controlled.

The valve 119 in the bypass line can be pressure actuated as described with regard to the previous embodiments of the invention, so that when an excessive pressure buildup is formed in line 95 the gas can directly enter below the mesh reactor region 103 thus bypassing the venturi throat area then go on through the mesh for cleanup and exit to the catalytic reactor 115. Additionally, the valve 119 can be formed of a temperature sensitive bimetallic material such that it will be in a closed position until the automobile exhaust reaches operating temperatures. The reason for this is that by conducting all of the exhaust gas to the venturi 101 and the mesh 103, and exiting in the jacket 111 the carbonate 93 can be preheated to a molten state so that the venturi will be effective. Additionally, aiding this, of course, is the impingement of the hot gases on the surface of the molten carbonate through the venturi area. When the engine exceeds desired operating temperatures the bypass valve 119 will open so that a portion of the gas is then passed through the cooling bypass tube 117 before entering the scrubber below or ahead of the wetted mesh. The valve 119 will then only open when a pressure buildup or excessive exhaust temperature is obtained. The bypass can then prevent overheating of the scrubber.

The catalytic reactor 115 is comprised of an insulated housing 121. Housing 121 maybe insulated with asbestos material or other suitable known insulators. This may be required so that the catalytic reaction can take place at optimum temperature conditions which are obtainable when the exhaust gas is at the operating temperature of the engine. The gas entering the catalytic reactor 115 has been previously scrubbed so that the lead impurities are removed therefrom by the molten carbonate. The function of catalytic reactor 115 is to reduce the NO present in the gas by reacting it with CO in accord with the following primary reaction:

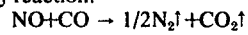
$$NO + CO \rightarrow 1/2 N_2\uparrow + CO_2\uparrow$$

Thus, the reactor 115 preferably contains a catalytic surface 123. The catalytic surface 123 is preferably of copper or nickel or copper-nickel containing alloys of fine wire mesh such as the Monel alloy mesh and serves the function as disclosed in copending application Ser. No. 13,246. Following the reactor 115 is an afterburner stage 125 which additionally contains a catalytic surface 127 which may be of the same material utilized in the reactor 115. In a line 129 connecting the reactor to the afterburner there is formed a venturi throat area 131 with a line 133 that admits air into the throat area of the venturi and mixes it with the exhaust gas prior to contacting catalytic surface 127 in the afterburner 125. This serves to convert CO to $CO_2$ and HC to $CO_2$ and $H_2O$ in the afterburner in accord with the following reactions:

$$CO + 1/2 O_2 \rightarrow CO_2$$
$$2CH + 1\ 1/2\ O_2 \rightarrow CO_2 + H_2O$$

Additionally, there is provided a pressure control bypass line 135 from the afterburner 125 before the venturi 131. A pressure-sensitive valve 137 is disposed in the bypass line and serves the function indicated in the previous embodiment such that the pressure buildup in the throat area of the second venturi 131 will allow the gas to pass directly to the afterburner. The exhaust gas from which the lead impurities, nitrogen oxides, sulfur oxides, CO, and other impurities are removed exits the afterburner 125 from exit line 139. In some embodiments it may be desirable to eliminate the venturi 131 and the bypass 135 and simply inject air into the connecting pipe 129 by connecting the air inlet line 133 with an external pressurized air source provided by a compressor.

Figure 5:
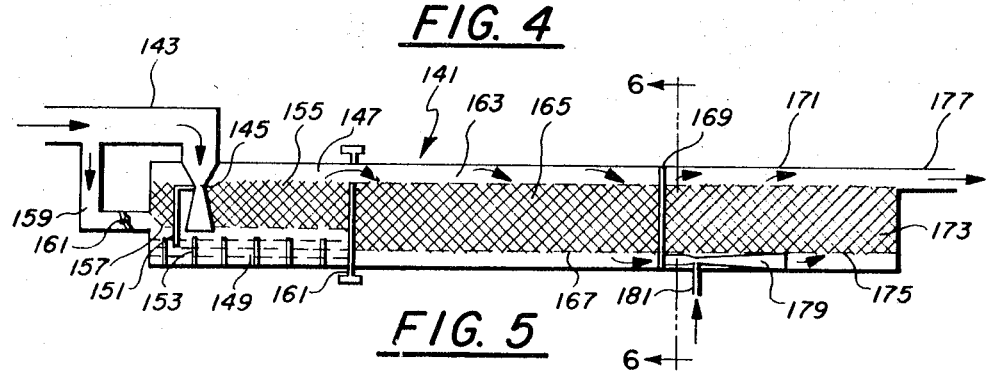
FIG. 5 is a schematic representation of a third embodiment of the invention.

Turning now to FIG. 5 there is seen another embodiment of the invention which incorporates the same three stages as shown in FIG. 4. However, they are disposed in an integral unit. The device is comprised of a continuous single housing 141 which is divided into various stages, as will be explained. The exhaust gas from the manifold of an engine will enter line 143 and be directed through a venturi 145 before passing into a first scrubber region 147 of the device. The exhaust gas leaving the venturi 145 impinges upon a large surface area of the carbonate salt mixture 149.

A line 151 is directed from the carbonate reservoir 149 to the venturi 145 and aspirates a portion of the salt when molten into the exhaust gas stream prior to it striking the surface of the molten salt, thus assuring intimate mixing of the carbonate with the exhaust gas and ensuring some wetting of the demister or reactor mesh which acts as the final gas scrub. Preferably, a plurality of baffles 153 are disposed in the carbonate reservoir 149 and serve to conduct heat from the hot gas and hot liquid surface into the carbonate mixture so as to readily preheat the carbonate. Disposed above the reservoir of alkali-metal carbonate 149 is an extended surface demister 155 which rests on a perforated plate 157 which can be a retainer ring, wire cloth or the like. The device is additionally provided with a temperature and pressure control bypass line 159 having a pressure and/or temperature sensitive valve 161 therein. The purpose of the line 159 and valve 161 has been explained with regard to the embodiment in FIG. 4.

In the present embodiment, the cooler gas prior to reaching operating temperatures of the engine is first directed over the large surface of the molten carbonate in this embodiment, serving to preheat and melt the material. When operating temperature and flow conditions are exceeded at high power outputs, the valve 161 will open and the exhaust gases can bypass the venturi through the cooling tube while molten carbonate can still be aspirated through line 151 into the venturi 145 as a portion of the exhaust gas passes therethrough. A baffle 161 separates the scrubber region from a catalytic reactor stage 163. The baffle 161 is disposed so that the exhaust gas is forced up through the demister 155 before entering a dry catalyst 165 disposed on a perforated plate or retainer 167 within the reactor stage.

Figure 6:
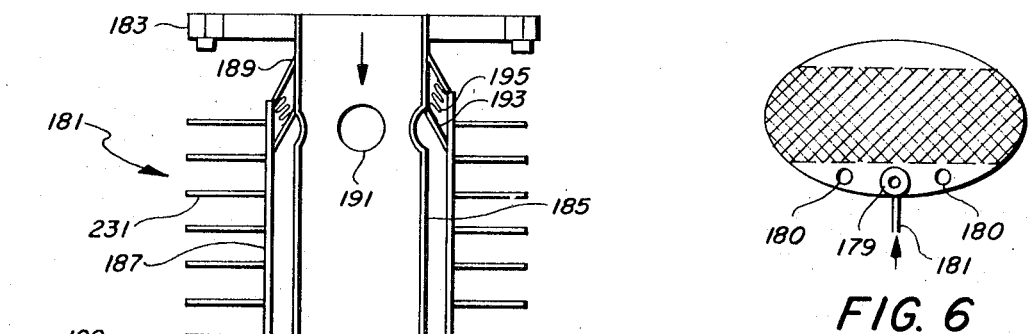
FIG. 6 is a cross-sectional view taken along line 6—6 of FIG. 5.

In the reactor stage the NO is reacted with CO, as indicated in the description of FIG. 4. The gas then leaves the reactor stage and passes through a baffle 169 which separates the reactor stage from an afterburner area 171. Baffle 169 is disposed so as to force the exhaust gas entering the reactor 165 through the mesh from the top of the device to the bottom thereof. The baffle 169 is perforated near the bottom to permit the gas to transfer from the NO reactor 163 to the CO—HC reactor afterburner 171. The afterburner stage 171 additionally contains a catalytic surface 173 supported on a grid 175 such that the gas can flow therethrough prior to leaving through exit line 177. Disposed in the afterburner stage so as to receive a portion of the gas from the reactor 163 is a venturi element 179 having an aspirator tube 181 exposed to air. This thus serves to suck air into the afterburner stage to react with the CO and hydrocarbons converting them to $CO_2$ and $H_2O$. Alternative to the utilization of such a second venturi in the afterburner stage, air can be forced in by a pump, fan, ram air scoop, or other suitable means. It should be pointed out that with regard to the embodiment of FIG. 5, the same reasoning applies that a second venturi is not mandatory and that any means for bringing air into the afterburner stage would be suitable for the operation of the device. To avoid excessive back pressure or pressure drop at high flows across the venturi or constriction 179 bypass ports 180 should be located in the baffle 169 between the two reactors and adjacent to the venturi or constriction (see FIG. 6). These ports may be orifices or spring or weight-loaded flapper valves.

Figure 7:
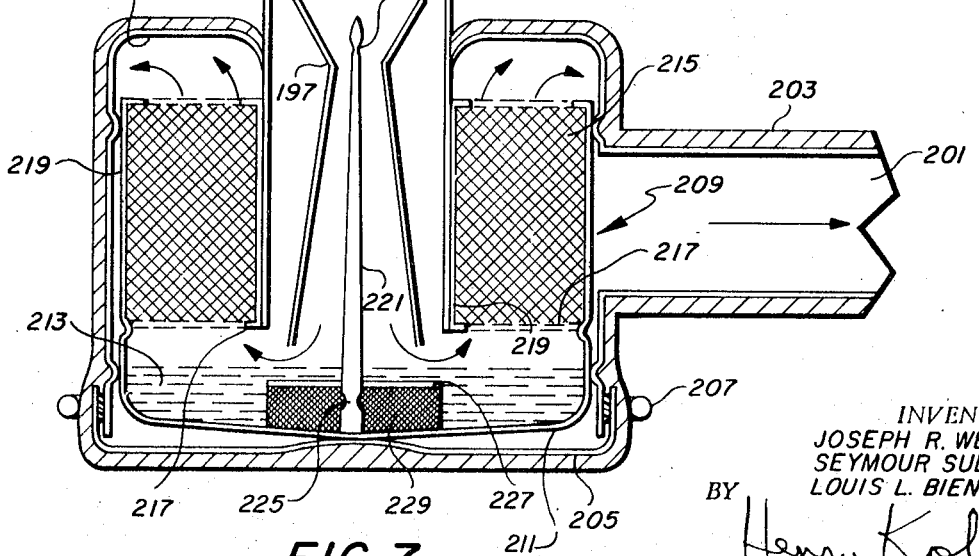
FIG. 7 is a schematic representation of a suitable scrubber of the invention.

Turning now to FIG. 7, there is seen a partially sectioned view of a scrubber device that can be utilized in the mufflers of the herein invention. A smaller sized version can also be utilized to remove the particulates and Pb halides from the portion of the exhaust that is recycled in exhaust recycle NO control system. (Normally 10 to 25 percent of the total exhaust flow is recycled to the intake manifold.) This device will aid in prevention of intake and exhaust recycle valve fouling which has heretofore plagued that system. The advantage of the particular device is that it provides for ready maintenance, allowing access for removal of the molten carbonate material. The device 181 is seen connected to an exhaust manifold flange 183 of an automobile. Device 181 is comprised of a central exhaust line 185 which extends from the exhaust manifold flange. The central exhaust line 185 is surrounded with an outer cylindrical line or housing 187 which is affixed to the exhaust line 185 at the top region 189 adjacent the manifold flange. The main exhaust line 185 has a plurality of bypass ports 191 formed therein adjacent to the upper region near the manifold flange. Each port has an associated flapper valve 193 affixed to springs 195 such that the valves are normally maintained in a closed position covering the bypass ports 191. The exhaust line 185 has a constricted throat area 197 formed therein to form a venturi at that region.

A containment can 199 is affixed to the outer cylindrical housing 187 and extends downwardly therefrom surrounding the lower portion of the housing 187. Integrally formed with the containment can 199 is an exhaust pipe 201 to carry the gas from the scrubber unit. The containment can 199 as well as the exhaust line 201 are preferably insulated with insulating material 203. An exhaust passage is formed between the inner canister 209 and the outer can 199 to conduct the hot, dried gas from the demister 217 to the outlet 201 while transferring heat to and warming the molten salt 213. The containment can 199 has a removable bottom portion 205 which is secured to the body of the can by a suitable tension clamp band 207. Disposed within the containment can 199 is a cartridge element 209. The cartridge element is comprised of a generally cylindrical housing 211 which contains adjacent the bottom portion thereof a reservoir 213 of alkali metal carbonate salt mixture. Supported above the mixture is a demisting mesh screen 215 which is contained between perforated grids or retainer rings 217. The grids or rings 217 in turn support a concentric neck portion 219 that surrounds the portion of the housing 187 within the containment can and serves to center the cartridge within the containment can. The cartridge is further provided with a hollow aspirator tube 221 which extends from the bottom of the can 199 upwardly, terminating adjacent the venturi throat. The aspirator tube has a plurality of ports 223 formed therein adjacent the venturi throat area, and an additional plurality of ports 225 formed in the area below the surface of the carbonate. Disposed above the lower suction ports 225 is a splash disc 227 which is affixed to the aspirator tube. Extending downwardly from the disc and surrounding the aspirator tube is a screen 229. The splash disc serves to prevent liquid from blowing away from the suction ports and to enhance heat transfer to the fluid immediately adjacent the suction ports to accelerate warmup and fluid circulation during cold starts and low speeds. The screen 229 prevents large particulates from plugging the aspirator tube ports 225. In the operation of the scrubber device, the flapper valves 193 are initially closed against the ports 191, thus all the exhaust gas will enter through exhaust line 185 to be impinged against the surface of the carbonate 213. As the carbonate melts, it is sucked up into the aspirator tube 221 and dispersed within the exhaust gas at the throat area 197 of the venturi. The exhaust gas containing entrained carbonate will then pass up through demisting mesh 215 leaving at the top thereof prior to exiting through the exhaust line 201 as a dry gas. At high operating speeds of an automobile, the back pressure of the venturi 197 will force open the bypass ports 191 by overcoming the spring pressure of springs 195 affixed to the flapper valves 193. This allows a portion of the exhaust gas then to flow around the exhaust tube 185 within the outer cylindrical housing or bypass tube 187. It is most desirable to maintain the operating temperatures of the scrubber between 800° and 1,200° F. At higher operating speeds of an automobile the exhaust gas temperature is normally increased. Thus, when the exhaust gas is forced through bypass ports 191 it is cooled within the outer housing or bypass line 187 due to a plurality of cooling fins 231 affixed to the outer housing, serving to lower the temperature of the exhaust gas and maintain the scrubber within the desired operating temperature range.

In a device described, the outer containment can 199, the inlet line 185 and its cylindrical housing 187, together with exhaust pipe 201 can be formed of conventional muffler steel and be permanently attached to the automobile. The inner canister element 209, together with the aspirator tube 221, and demisting mesh 215 can preferably be made of stainless steel or material which is noncorrodable by the contained salts and contaminants. The inner canister can, as can be appreciated, be readily removed from the device to be periodically cleaned and reconditioned by soaking in an acid bath and reloading with a fresh scrubbing liquid.

We claim:

1. A muffler device for treating the exhaust gas of an internal combustion engine to remove impurities therefrom comprising:
   an enclosed housing adapted for connection in the exhaust system of the engine,
   a sump region in the bottom of said housing containing a body of an absorbent material which is solid at room temperature and with forms a molten pool for absorbing and reacting with said impurities upon increasing the temperature of said body above its melting point, said molten pool being maintained at least by thermal energy transfer from the exhaust gas including contact of hot exhaust gas from said engine upon the surface of said body,
   an inlet line disposed in said housing and including an inlet port at one end thereof adapted to receive the impurity-containing exhaust gas from an exhaust manifold of said engine and including impinging means at the other end thereof for impinging said exhaust gas on the surface of said body of absorbent material,
   venturi means including a constricted throat portion disposed in said inlet line between said inlet port and said impinging means,
   means for aspirating the molten absorbent material into said exhaust gas including a line having one end disposed in said molten pool and the other end disposed in said constricted throat portion and including spray means for producing a dispersion of liquid droplets in said throat portion to provide exhaust gas-molten material contact area,
   bypass conduit means communicating with said inlet line prior to said venturi means for conducting exhaust gas from said engine to bypass said venturi means to regulate the pressure thereacross and to conduct the bypassed portion of said exhaust gas to a region above the surface of said molten pool to intermix with exhaust gas exiting from said venturi means,
   said bypass conduit means including valve means at least responsive to the pressure of the exhaust gas stream entering said venturi means,
   contacting and demisting means including a metal mesh packing disposed in said housing downstream from said spray means providing for further exhaust gas-molten material contact area and for separation of entrained molten material from said exhaust gas to provide a resultant dry exhaust gas, and
   an outlet port disposed in said housing and positioned downstream from said metal mesh packing for discharging the dry purified exhaust gas stream from said housing.

2. The muffler device of claim 1 wherein said body of absorbent material contains at least 2 weight percent of an active absorbent salt consisting of an alkali metal carbonate.

3. The muffler device of claim 2 wherein said body of absorbent material contains at least 50 weight percent of the active absorbent salt which consists of a ternary mixture of the carbonates of lithium, sodium, and potassium.

4. The muffler device of claim 3 wherein said active absorbent salt is a eutectic composition molten above 395° C. and consisting essentially of, in mole percent, 45±5 lithium carbonate, 30±5 sodium carbonate, and 25±5 potassium carbonate.

5. The muffler device of claim 1 wherein a plurality of cooling means are affixed to the outer wall of the bypass conduit means between said inlet port and said sump region for maintaining said device within a desired operating temperature range.

6. The muffler device of claim 1 wherein said inlet line is concentrically disposed within said housing and affixed thereto so as to define said bypass conduit means,
   a plurality of valved ports disposed in said inlet line prior to said venturi means and communicating in open position with said bypass conduit means, said ports coacting with cooperatively disposed associated valve and spring means for maintaining said ports in a normally closed position at below a preselected pressure of the exhaust gas stream entering the venturi means, and
   containment means cylindrically disposed about and attached to the outer wall of said housing and which contain at least said contacting and demisting means.

7. The muffler device of claim 6 wherein said sump region containing said body of absorbent material, said demisting and contacting means, and the aspirator means are integrally attached to the inner wall of a removable cartridge element contained in said containment means and removable therefrom.

8. The muffler device of claim 1 further including a second exhaust gas treatment zone positioned downstream from said contacting and demisting means, said second zone including separate catalyst means for receiving and treating the dry exhaust gas from said demisting means.

9. The muffler device of claim 8 wherein said separate catalyst means includes a dry metal mesh packing.

10. The muffler device of claim 8 wherein said second exhaust gas treatment zone is contained in a separate second housing connected to said first housing to receive the dry exhaust gas therefrom.

11. The muffler device of claim 8 further including a third exhaust gas treatment zone positioned downstream from said second zone and including separate catalyst means for receiving and oxidatively treating the dry exhaust gas from said second zone prior to emitting said gas from the device.

12. The muffler device of claim 11 wherein each of said second and third exhaust gas treatment zones is contained in a separate housing therefor.

13. The muffler device of claim 11 further including second venturi means and air inlet means disposed between said second and third zones for aspirating ambient air into said third zone for oxidatively treating said exhaust gas.

14. The muffler device of claim 13 further including pressure-responsive bypass means for bypassing a portion of the exhaust gas entering said second venturi means to regulate the pressure therein.

* * * * *